Sept. 4, 1934.  C. G. SUITS  1,972,696
CONTROL SYSTEM
Filed April 29, 1933
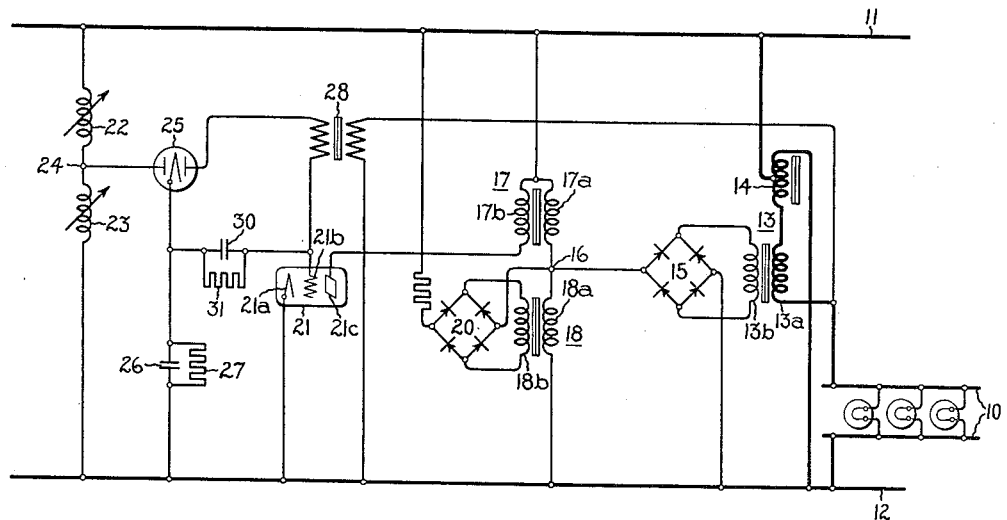
Inventor:
Chauncey G. Suits,
by Charles E. Mullan
His Attorney.

Patented Sept. 4, 1934

1,972,696

UNITED STATES PATENT OFFICE 1,972,696

CONTROL SYSTEM

Chauncey G. Suits, Schenectady, N. Y., assignor to General Electric Company, a corporation of New York Application April 29, 1933, Serial No. 668,598

2 Claims. (Cl. 171—242)

This invention relates to control systems, more particularly to systems in which the voltage or other electrical characteristic of an electric circuit is varied over a wide range of values, and it has for an object the provision of a simple, reliable, inexpensive and improved system of this character.

More specifically the invention relates to systems in which a load circuit is controlled by means of saturable reactance devices, the direct current control windings of which are supplied from a source of variable direct current of limited range, and it has for a further object the provision of means for obtaining a greatly increased range of voltage variation of the reactance winding of the reactance device at minimum expense.

In carrying the invention into effect in one form thereof, a load circuit is controlled by means of a pair of saturable reactance devices having their reactance windings connected together. Means are provided for supplying a variable direct current to the magnetization control winding of one of the devices and connections including a rectifying device are provided between the reactance winding of this device and the control winding of the other device for effecting inverse variation of the voltages of the reactance winding.

This invention is an improvement of the invention described and claimed in my earlier application, Serial No. 661,532, filed March 18, 1933, and assigned to the same assignee as that of the present invention, and I do not herein claim anything shown in my said prior application which as far as this invention is concerned is to be regarded as prior art.

In illustrating the invention in one form thereof, it is shown as embodied in an illumination control system such for example as a theatre light dimming system.

For a better and more complete understanding of the invention reference should now be had to the following specification and to the accompanying drawing the single figure of which is a simple, diagrammatical illustration of an embodiment of the invention.

Referring now to the drawing, a load circuit 10, illustrated as a plurality of electric lamps, is supplied from a suitable source of alternating current, such for example, as that represented in the drawing by the upper and lower supply lines 11 and 12. For the purpose of varying the voltage applied to the lamp and consequently the intensity of illumination thereof, means illustrated as a variable impedance device 13 are provided. This variable impedance device is of the direct current saturable core type, having its alternating current winding 13a connected in series relationship with the load circuit 10 and the winding of an auto transformer 14 to the supply source 11, 12. For the purpose of controlling the saturation of its core, the device 13 is provided with a direct current magnetic control winding 13b. The reactance of the device 13 depends upon the degree to which the core is saturated by the direct current flowing in the direct current control winding and since the reactance is thus variable, it is seen that the reactive voltage drop across the winding 13a is likewise variable in accordance with the degree of saturation. A variation in the reactance of the alternating current winding 13a effects a variation in the voltage drop across the load circuit 10 and thus it will be seen that by varying the current flowing in the control winding 13b the intensity of illumination of the lamps of the load circuit is likewise varied.

Direct current of variable magnitude is supplied to the control winding 13b by any suitable rectifying means such for example as a surface contact rectifying device illustrated in the form of a copper oxide rectifying bridge 15. The utilization of the rectifying bridge 15 is purely optional and it is pointed out that instead of the bridge any other suitable rectifying device such for example as a pair of electric valves connected for full wave rectification may be employed. One pair of opposite terminals of the bridge 15 are connected to respective terminals of the control winding 13b whilst one of the remaining pair of terminals is connected to the lower supply line 12 and the other terminal is connected at 16 to the common connection of the alternating current windings of a pair of saturable reactance devices 17 and 18.

The respective alternating current windings 17a and 18a of these devices are connected in series relationship with each other to the supply lines 11, 12. Since the bridge 15 is connected in parallel relationship with the alternating current winding 18a the direct current supplied to the control winding 13b varies in accordance with variations in the voltage of the alternating current winding 18a.

The saturable reactance device 18 is provided with a direct current magnetization control winding 18b which is supplied with direct current of variable magnitude by any suitable means such for example as the surface contact rectifying bridge 20. As shown, the control winding 18b is connected to a pair of opposite terminals of the bridge whilst the remaining pair of terminals of the bridge is connected in parallel relationship with the alternating current windings 17a of the saturable reactance device 17. If the voltage across the alternating current winding 17a increases the direct current supplied to the control winding 18b increases and the voltages across the alternating current winding 18a is reduced. Since the voltage drop across the supply lines 11, 12 is substantially constant it is seen that an increase in the voltage across the reactive winding 17a must effect a reduction in voltage across the winding 18a. Furthermore since the saturation of the device 18 is increased proportionally, the voltage drop across the winding 18a is still further reduced. Similarly a decrease in the voltage across the winding 17a results in an increase in the voltage across the winding 18a. Thus it is seen that the connection of the control winding 18b to the reactance winding 17a results in inverse variation of the reactances and voltage drop across the windings 17a and 18a. The advantage of this arrangement is that the range of voltage variation across either of the reactance windings 17a and 18a is greater than could be effected by a single reactance device of greater capacity than either of the devices 17 or 18 and thus the cost of the system is considerably lessened.

The reactance device 17 is provided with a direct current magnetization control winding 17b through which direct current of variable magnitude is supplied by means of a suitable rectifying device illustrated as a three-element electric valve 21. The valve 21 is preferably of the "hard" or "high-vacuum" type, and as illustrated its three elements comprise a cathode 21a, a grid 21b and a plate or anode 21c. The cathode 21a is connected to the lower supply line 12 while the anode 21c is connected to the upper supply line 11 through the direct current control winding 17b of the reactance device. The valve 21 thus supplies half-wave rectified current to the control winding of the reactance.

In order to vary the current flowing in the control winding, the control grid 21b of the valve is connected to a source of variable voltage. This source of variable voltage is illustrated as a variable voltage drop device comprising a pair of solenoids 22 and 23 having their reactance windings connected in series relationship with each other across the supply lines 11, 12. These solenoids 22 and 23 are provided with movable core members (not shown) and these core members in turn are connected to a movable, manually operable control handle so that movement of the handle in one direction moves one core into its winding and retracts the other core from its winding, whilst movement of the handle in the opposite direction withdraws the first core from its winding and advances the second core into its winding. It will thus be seen that by varying the positions of these cores within the windings 22, 23, the voltage of the common point 24 between the two windings is varied over a wide range of values, i. e. between a value approximating the instantaneous voltage of the supply line 11 and a second value approximating the instantaneous voltage of the supply line 12.

The voltage of this common point 24 is, of course, alternating and for the purpose of applying a direct current voltage from the point 24 to grid 21b of the valve, a suitable rectifying device 25 is included in the connection between the point 24 and the grid 21b. As shown, the rectifying device 25 is provided with two anodes, one of which is connected to the common point 24, and is also provided with a cathode connected to the grid 21b. This cathode is also connected to the lower supply line 12 through a suitable filter device illustrated as comprising a condenser 26 and a resistance 27 connected in parallel relationship with each other. The rectifying device 25 rectifies but one-half of the wave of the alternating voltage between the points 24 and the lower supply line 12. However, this half-wave rectified voltage is smoothed by means of the filter device so that a substantially constant direct current voltage is applied to the grid 21b.

In order to maintain the voltage across the load circuit 10 at a substantially constant ratio with respect to the voltage of the common point 24, irrespective of variations in the load, i. e., in the number of lamps connected across the load circuit 10, a feed back voltage is supplied from the load circuit to the grid 21b of the valves. This feed back voltage is applied to the grid of the valve by means of a feed back transformer 28, the terminals of the primary winding of which are connected directly across the load circuit 10 and one terminal of the secondary winding of which is connected to an anode of the rectifying device 25 and the other terminal of which secondary winding is connected to the grid 21b. In addition, it is observed that this last mentioned terminal of the secondary winding of the transformers 28 is also connected to the cathode of the rectifying device 25 through a filter device illustrated as comprising a capacitance 30 and a resistance 31 connected in parallel relationship with each other. Since the voltage of the load circuit 10 is alternating, the feed back voltage at the secondary terminals of the transformer 28 is also alternating. One-half of the wave of this alternating voltage is rectified by the rectifying device 25 and is smoothed by the filter device so that a smooth direct current voltage is applied to the grid. The connections from the secondary winding of the feed back transformer to the rectifying device 25 and to the grid 21b are so chosen that the polarity of the feed back voltage applied to the grid is opposite to the polarity of the voltage applied from the common connection 24 to the grid and it will thus be seen that the connection serves to compare the load voltage with the voltage of the common connection 24 and thus to equalize these voltages, or to maintain them in a substantially constant ratio in a well understood manner.

In operation, a movable handle operatively connected with the cores of the coils 22 and 23 is moved to a position on a calibrated scale (not shown) corresponding with a desired intensity of illumination of the lamps of the load circuit 10. This movement of the handle advances one core into its associated coil and withdraws the other core from its associated coil by an amount proportional to the movement of the handle. As a result a variation is effected in the voltage of the common point 24 and this likewise results in a variation of the voltage applied to the grid 21b of the valve. This variation in the grid voltage of the valve effects a corresponding variation in the magnitude of the direct current supplied to the magnetization control winding 17b of the variable saturable reactance device 17.

Assuming that the control handle associated with the coils 22 and 23 is moved in the direction for increasing the intensity of illumination of the lamps of the load circuit, the current supplied to the control winding 17b is increased. This increase in the current in the control winding results in increasing the saturation of the device and in decreasing the reactance thereof, thereby effecting a decrease in the voltage drop across the reactance winding 17a. Since the voltage drop across the supply source 11, 12 remains substantially constant the decrease in voltage across the reactive winding 17a results in an increase in the voltage drop across the reactive winding 18a. Furthermore, the decreased voltage drop across the reactive winding 17a decreases the magnitude of the rectified current supplied to the control winding 18b thereby decreasing the saturation of the saturable reactance device 18 and further increasing the reactance and the voltage drop across the winding 18a. It is thus seen that variation of the current flowing in the control winding 17b effects a variation in the impedance ratios of the reactance devices 17 and 18 and it is also seen that the impedance ratio of each device, i. e., the ratio of the maximum impedance to the minimum that could be obtained in either device singly as a result of limited range of current variation that can be obtained from the valve 21, is correspondingly increased. This is advantageous in that the size and cost of the control equipment required to supply the variable direct current to the control winding 17b are reduced to a minimum. The increased voltage across the winding 18a increases the input to the rectifying device 15 and likewise increases the current supplied to the control winding 13b of the reactance device 13. As the current increases in the control winding 13b, the reactive voltage drop across the alternating current winding 13a is decreased, thereby resulting in an increase in the voltage across the load circuit 10 and consequently an increase in the intensity of illumination of the lamps.

Movement of the control handle associated with the coils 22 and 23 in the opposite direction from that assumed in the above explanation results in decreasing the voltage applied to the load circuit 10 and in decreasing the intensity of illumination of the lamps in a manner that is clear from the above description in connection with the intensity increasing operation and hence requires no further elaboration. During the above operation, the feed back circuit accurately compares the voltage of the load circuit with that at the common point 24 in a well understood manner so that the voltage of the load circuit is maintained either equal to or at a substantially constant ratio to the voltage of the connection 24 irrespectively of the value of the load, i. e., the number of lamps connected across the load circuit 10.

The function of the boosting transformer 14 is to enable substantially 100% of line voltage to be applied to the load circuit 10 without requiring an increase in the size and cost of the apparatus required for supplying variable direct current to the control winding 13b. Since the magnetization of the saturable reactance device 13 does not increase in direct proportion to the current in the control winding 13b it is clear that as saturation is approached, a very large increase in the current in the winding 13b is required to effect only a very small change in the voltage drop across the winding 13a. Consequently in order to apply full line voltage to the lamps 10 a very large and expensive reactor would be required. However the size of the reactor required to supply substantially 90% line voltage to the lamps 10 is relatively small. Consequently the booster transformer 19 is designed to supply the remaining 10% of the line voltage and as a result the size and cost of the reactor 13 is kept at a minimum.

Although in accordance with the provisions of the patent statutes this invention is described as embodied in concrete form, it will be understood that the apparatus and connections shown are merely illustrative and that the invention is not limited thereto since alterations and modifications will readily suggest themselves to persons skilled in the art without departing from the true spirit of this invention or the scope of the annexed claims.

What I claim as new and desire to secure by Letters Patent of the United States, is:

1. A control system for theatre illumination dimming circuits and the like comprising a load circuit, a saturable reactance device having a reactance winding and a direct current magnetization control winding, a boosting transformer, said load circuit, reactance winding and a boosting transformer being connected in series relationship to a source of alternating voltage, a pair of saturable reactance devices each having a reactance winding and a direct current magnetization control winding, means connecting the reactance windings of said pair of devices to a source of alternating voltage, means for supplying a variable direct current to the control winding of one of said pair of devices, connections including a rectifying device between the reactance winding of one of said pair of devices and the control winding of the other of said pair of devices for effecting inverse variation of the voltages of said pair of reactances, and connections including a rectifying device between the reactance winding of one of said pair of devices and the control winding of said first mentioned reactance device to effect variation of the voltage of said load circuit.

2. A control system for theatre illumination and the like comprising a load circuit, a saturable reactance device having a reactance winding and a direct current magnetization control winding, said reactance winding and said load device being connected in series relationship to a source, a pair of control saturable reactance devices each having a reactance winding and a direct current magnetization control winding, means connecting the reactance windings of said control reactance devices in series relationship to a source, electric valve means provided with an input circuit and with an output circuit connected to the control winding of one of said pair of devices for supplying a variable direct current thereto, connections including a rectifying device between the reactance winding of said one reactance device and the control winding of the other of said pair of reactance devices for effecting inverse variation of the voltages of said devices, connections including a rectifying device between the reactance winding of said last mentioned reactance device and the control winding of said first mentioned reactance device for effecting variation of the voltage of the said load circuit and a feed-back circuit from said load device to the input circuit of said valve means for maintaining the voltage of said load circuit substantially constant at a predetermined value.

CHAUNCEY G. SUITS.